US006781546B2

United States Patent
Wang et al.

(10) Patent No.: US 6,781,546 B2
(45) Date of Patent: Aug. 24, 2004

(54) INTEGRATED ANTENNA FOR PORTABLE COMPUTER

(75) Inventors: Chi-Yueh Wang, Kaohsiung (TW); Tsung-Wen Chiu, Taipei (TW); Boon-Tiong Chua, Kaohsiung (TW)

(73) Assignee: Yageo Corporation, Taipei (TW)

( * ) Notice: Subject to any disclaimer, the term of this patent is extended or adjusted under 35 U.S.C. 154(b) by 0 days.

(21) Appl. No.: 10/300,563

(22) Filed: Nov. 20, 2002

(65) Prior Publication Data

US 2004/0017319 A1 Jan. 29, 2004

(30) Foreign Application Priority Data

Jul. 24, 2002 (TW) ........................................ 91116470 A

(51) Int. Cl.⁷ ................................................ H01Q 1/38
(52) U.S. Cl. ................................ 343/700 MS; 343/702
(58) Field of Search .......................... 343/700 MS, 702, 343/846, 848

(56) References Cited

U.S. PATENT DOCUMENTS 6,339,400 B1  1/2002  Flint et al.
6,515,629 B1 * 2/2003  Kuo et al. ............ 343/700 MS
6,661,380 B1 * 12/2003  Bancroft et al. ..... 343/700 MS

* cited by examiner

*Primary Examiner*—James Vannucci
(74) *Attorney, Agent, or Firm*—Senniger, Powers, Leavitt & Roedel

(57) ABSTRACT

The invention relates to an integrated antenna for a portable computer. The portable computer has a main frame. The integrated antenna comprises a substrate, a first radiating metal strip, a second radiating metal strip, a ground plane, at least one first connecting metal strip and second connecting metal strip. The substrate has a connecting portion for connecting to the main frame. The first radiating metal strip is used to induce a first resonance, and the second radiating metal strip is used to induce a second resonance. The first connecting metal strip connects to the first radiating metal strip and the second radiating metal strip. The second connecting metal strip connects to the second radiating metal strip and the ground plane. The integrated antenna of the invention is mounted to the main frame of the portable computer. The length of a coaxial cable can be reduced. Therefore, the transmission loss and cost can be reduced. Furthermore, the integrated antenna can be easily mounted on the main frame of portable computer.

7 Claims, 6 Drawing Sheets

INTEGRATED ANTENNA FOR PORTABLE COMPUTER

BACKGROUND OF THE INVENTION

1. Field of the Invention

The present invention relates to an antenna, more particularly, to an integrated antenna for a portable computer.

2. Description of the Related Art

In recent years, portable wireless communications devices are becoming increasingly popular. Almost all products must have the function of wireless communications. For a portable computer, wireless communications can reduce the connection wires and solve the problem of setting parameters for hardware of the portable computer. To obtain the function of wireless communications, it is necessary to install an antenna on the portable computer. It is important for a portable computer to include a good designed antenna attached to an adequate position thereof.

Referring to FIG. 1, according to U.S. Pat. No. 6,339,400 B1, antennas 11 and 12 are disposed around a display 10 of a portable computer 1. However, at present, the size of the display of the portable computer is becoming large such that not much space are left to accommodate the antenna. Even if there is space for accommodating the antenna, a very long coaxial cable is needed to connect the antenna to a circuit on a main frame of the portable computer. Therefore, the cost and transmission loss will increase. Besides, it is difficult to install the antenna on the peripheral of the display of the portable computer.

Furthermore, a conventional antenna used for a portable computer can be categorized into a slot antenna, a monopole antenna or a dipole antenna. The slot antenna radiates in two directions, and must connect to a ground plane with large area. An open slot antenna has a resonant length equal to quarter-wavelength of the operating frequency. A closed slot antenna has a resonant length equal to half-wavelength of the operating frequency. The monopole antenna must be disposed away from a ground plane and metal plane. The monopole antenna has a resonant length equal to quarter-wavelength of the operating frequency. The dipole antenna must be disposed away from a ground plane and metal plane. The dipole antenna has a resonant length equal to quarter-wavelength of the operating frequency. The difference between the monopole antenna and the dipole antenna is that the dipole antenna must have a ground metal plane corresponding to a radiating metal strip. Therefore, the total length of the dipole antenna is half-wavelength of the operating frequency. It is a big limitation that the monopole antenna and the dipole antenna must be disposed away from the ground plane and metal plane. Besides, it is a serious defect that the above antennas can easily be interfered by the outside circumference.

Therefore, it is necessary to provide an innovative and progressive integrated antenna so as to solve the above problem.

SUMMARY OF THE INVENTION

One objective of the present invention is to provide an integrated antenna for a portable computer. The portable computer has a main frame. The integrated antenna comprises a substrate, a first radiating metal strip, a second radiating metal strip, a ground plane, at least one first connecting metal strip and a second connecting metal strip. The substrate has a connecting portion for connecting to the main frame. The first radiating metal strip is used to induce a first resonance, and the second radiating metal strip is used to induce a second resonance. The first connecting metal strip connects the first radiating metal strip and the second radiating metal strip. The second connecting metal strip connects the second radiating metal strip and the ground plane.

The integrated antenna of the invention is mounted to the main frame of the portable computer. The length of a coaxial cable can be reduced. Therefore, the transmission loss and cost can be reduced. Furthermore, the integrated antenna can be easily mounted on the main frame of portable computer.

According to the invention, the integrated antenna can be operated in multi-band, and has high radiation efficiency and stable performance. Additionally, because the first radiating metal strip, the second radiating metal strip and the ground plane are formed on the first surface of the substrate, the integrated antenna can be easily manufactured and there is no the problem for positioning the above elements and the substrate so as to reduce the error of the integrated antenna.

DETAILED DESCRIPTION OF THE INVENTION

Figure 2A:
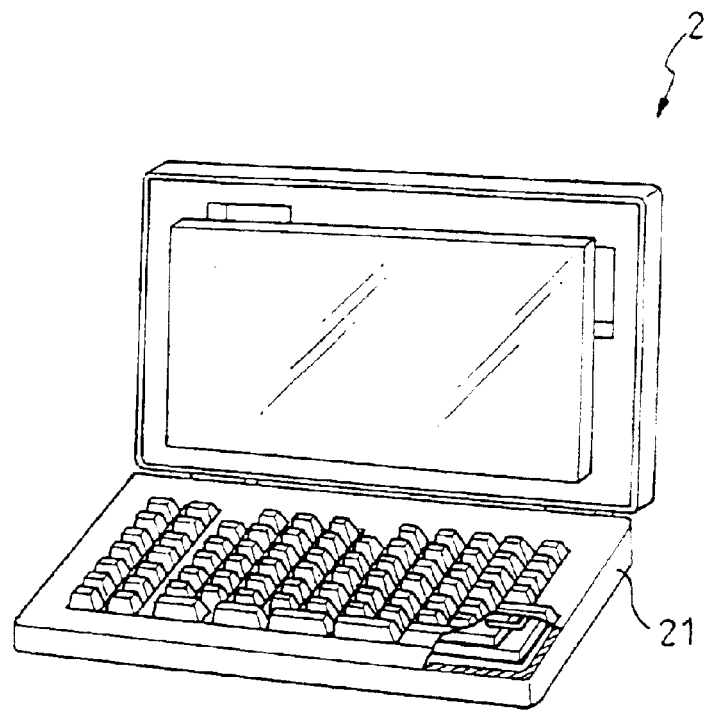
FIG. 2A shows an integrated antenna disposed in a main frame of a portable computer, according to the invention.
Figure 2B:
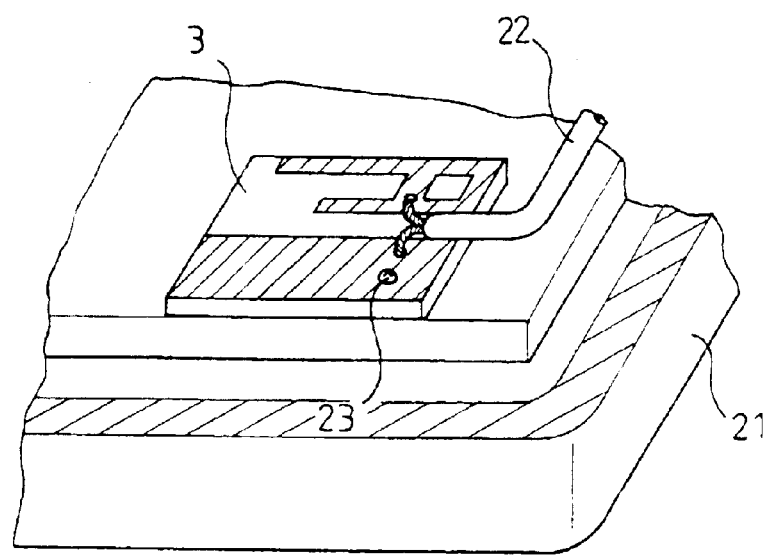
FIG. 2B shows an enlarged partial perspective view of illustrating an integrated antenna disposed in a main frame of a portable computer, according to the invention.

Referring to FIGS. 2A and 2B, according to the invention, a portable computer 2 has a main frame 21. An integrated antenna 3 is mounted on the main frame 21 of the portable computer 2. Two integrated antennas 3 can be mounted on two sides of the main frame 21, respectively, so as to obtain better communication between the portable computer 2 and peripheral equipments.

Figure 3:
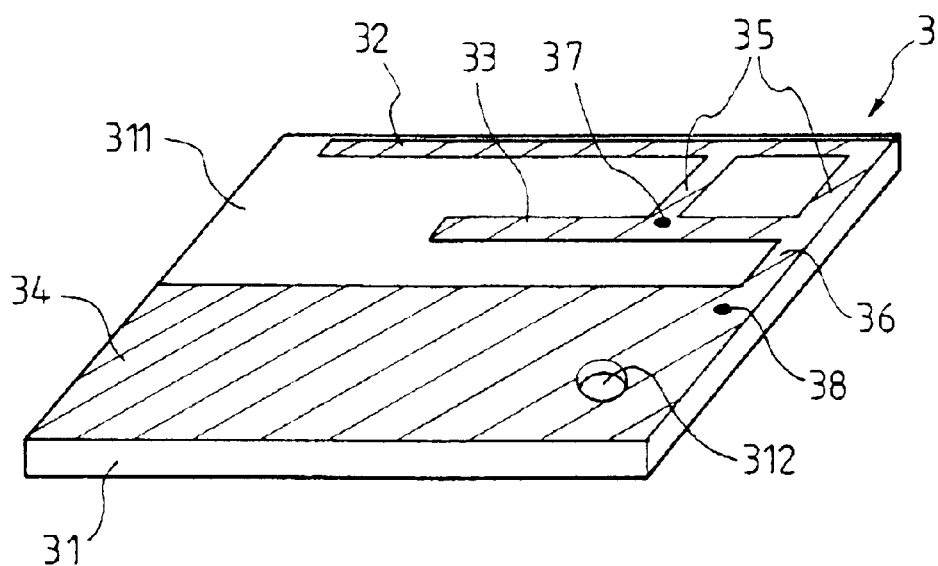
FIG. 3 shows the perspective view of an integrated antenna, according to the first embodiment of the invention.

Referring to FIG. 3, the integrated antenna 3 comprises a substrate 31, a first radiating metal strip 32, a second radiating metal strip 33, a ground plane 34, a first connecting metal strip 35 and a second connecting metal strip 36. The substrate 31 has a first surface 311 and a connecting portion 312. The connecting portion 312 is used for connecting to the main frame 21. The connecting portion 312 is a hole penetrating through the ground plane 34 and the substrate 31. The hole is used to receive a screw 23 to fix the integrated antenna 3 on the main frame 21 of the portion computer 2, as shown in FIG. 2B.

The first radiating metal strip 32 of the integrated antenna 3 is formed on the first surface 311 of the substrate 31, and is used to induce a first resonance. The second radiating metal strip 33 is formed on the first surface 311 of the substrate 31 with respect to the first radiating metal strip, and is used to induce a second resonance. The first radiating metal strip 32 is spaced at a distance from the second radiating metal strip 33, and is substantially parallel to the second radiating metal strip 33.

The ground plane 34 is formed on the first surface 311 of the substrate 31 with respect to the second radiating metal strip 33. The ground plane 34 is spaced at a distance from the second radiating metal strip 33, and is substantially parallel to the second radiating metal strip 33. The ground plane 34 is connected to a ground terminal. The connecting portion 312 of the antenna 3 is disposed on the ground plane 34. By fixing the connecting portion 312 to the main frame 21 of the portable computer 2, the ground plane 34 is fixed on the main frame 21.

The first connecting metal strip 35 connects the first radiating metal strip 32 and the second radiating metal strip 33, and is formed on the first surface 311 of the substrate 31. The first connecting metal strip 35 is substantially perpendicular to the first radiating metal strip 32 and the second radiating metal strip 33. The integrated antenna 3 has two first connecting metal strips 35 connecting to the first radiating metal strip 32 and the second radiating metal strip 33 on a middle portion and a side of the substrate 31 respectively.

The second connecting metal strip 36 connects the second radiating metal strip 33 and the ground plane 34, and is formed on the first surface 311 of the substrate 31. The second connecting metal strip 36 is substantially perpendicular to the second radiating metal strip 33 and the ground plane 34. The second connecting metal strip 36 connects the second radiating metal strip 33 and the ground plane 34 on a side of the substrate 31.

According to the first embodiment of the invention, the second radiating metal strip 33 further comprises a feed portion 37 for connecting a signal terminal of a coaxial cable 22, as shown in FIG. 2B. The ground plane 34 further comprises a ground portion 38 for connecting a ground terminal of the coaxial cable 22, as shown in FIG. 2B. The coaxial cable 22 is used to connect the integrated antenna 3 to a control circuit of the portable computer 2 so as to utilize the integrated antenna 3 to process communication with peripheral equipments.

Figure 1:
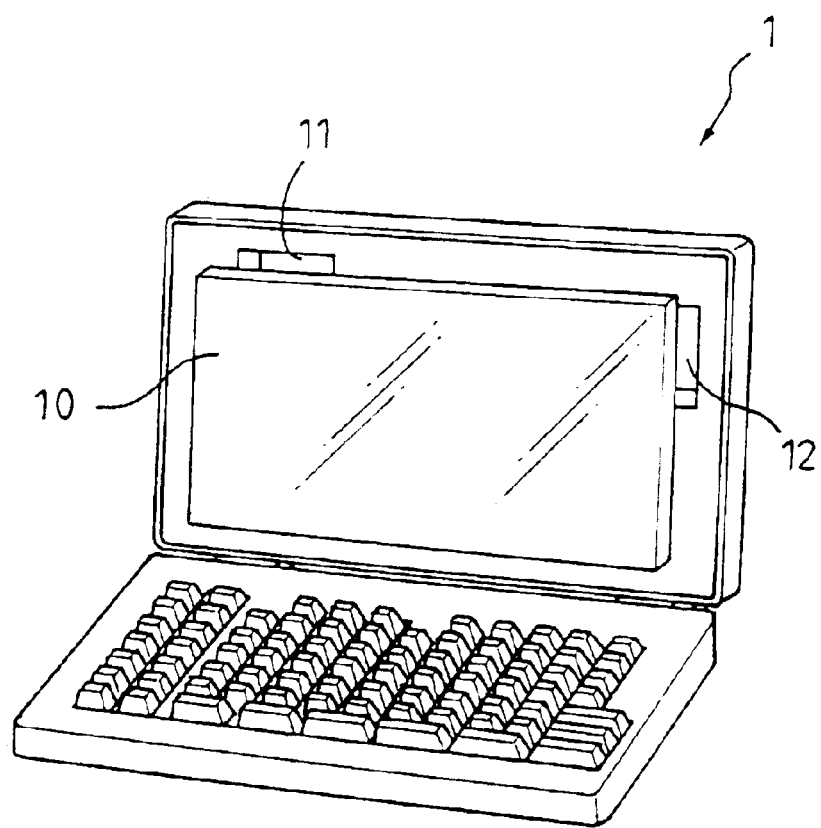
FIG. 1 illustrates a conventional antenna disposed in a display of a portable computer.

Compared with the conventional antenna 11, 12 disposed on the display 10 of the portable computer 1 as shown in FIG. 1, because the integrated antenna 3 of the invention is mounted to the main frame 21 of the portable computer 2, the length of the coaxial cable 22 can be reduced. Therefore, the transmission loss and cost can be reduced. Furthermore, the integrated antenna 3 can be mounted easily on the main frame 21 of portable computer 2.

Figure 7:
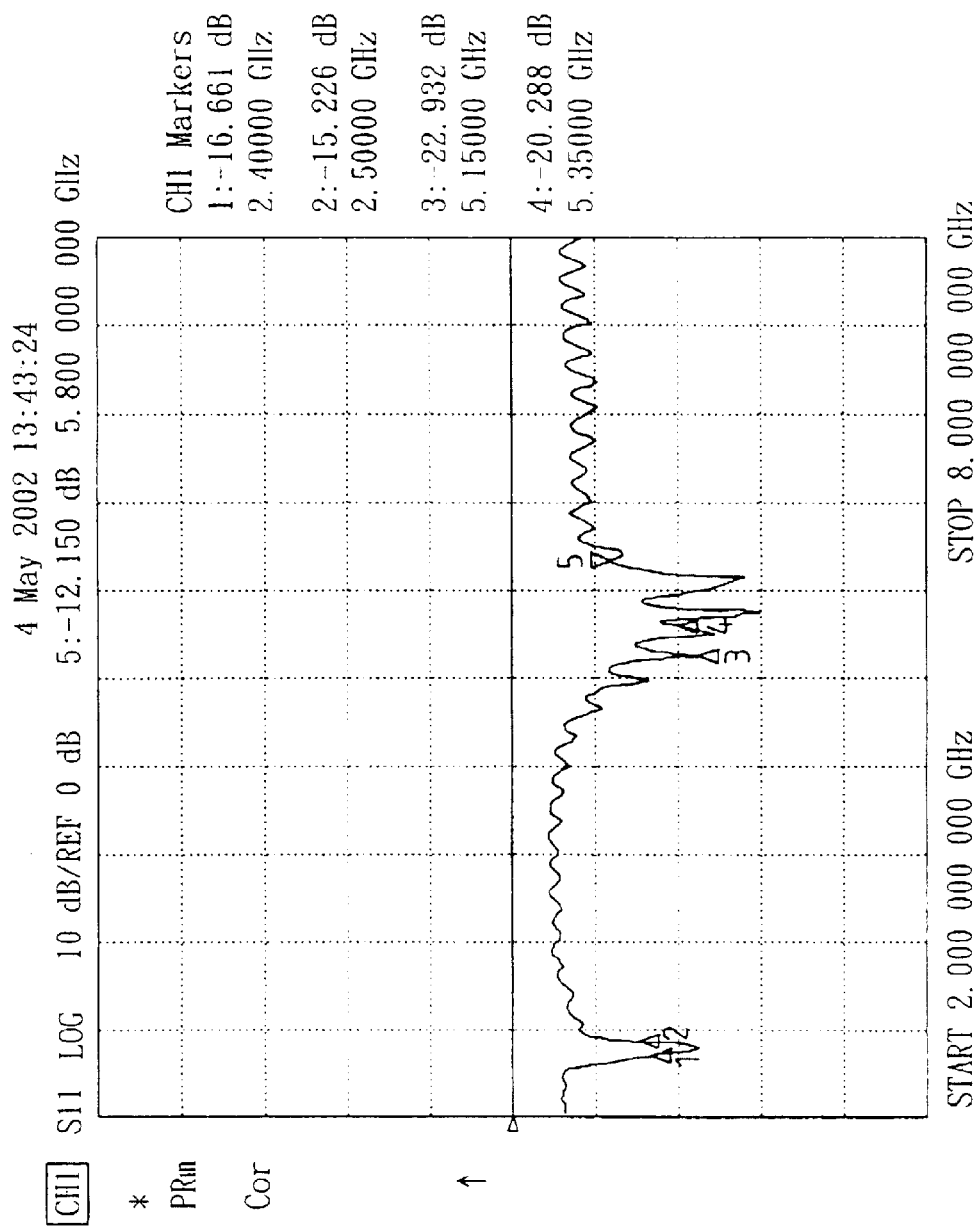
FIG. 7 shows a return loss frequency response chart that illustrates an integrated antenna of the first embodiment disposed in a main frame of a portable computer.

Referring to FIG. 7, the integrated antenna 3 and the coaxial cable with the length 550 mm are mounted on the main frame of the portable computer, and a simulation for the embodiment is measured. As a result, the integrated antenna can be operated in multi-band, for example, 2.45 GHz and 5.2 GHz, and has high radiation efficiency and stable performance. Additionally, because the first radiating metal strip 32, the second radiating metal strip 33 and the ground plane 34 are formed on the first surface 311 of the substrate 31, the integrated antenna 3 can be easily manufactured and there is no problem for positioning the above elements and the substrate so as to reduce the error of the integrated antenna 3.

Figure 4:
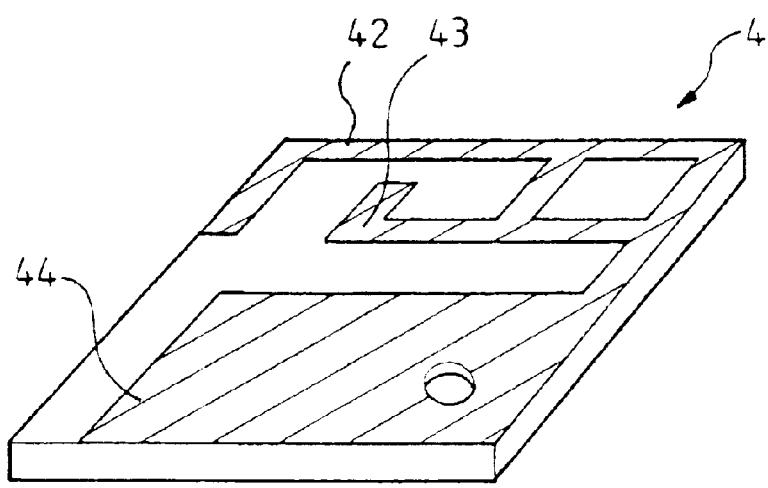
FIG. 4 shows the perspective view of an integrated antenna, according to the second embodiment of the invention.

Referring to FIG. 4, according to the integrated antenna 4 of the second embodiment of the invention, the difference between the integrated antenna 4 of the second embodiment and the integrated antenna 3 of the first embodiment is that the first radiating metal strip 42 further comprises a first extending portion extending toward the ground plane 44, and the second radiating metal strip 43 further comprises a second extending portion extending toward the first radiating metal strip 42.

Figure 8:
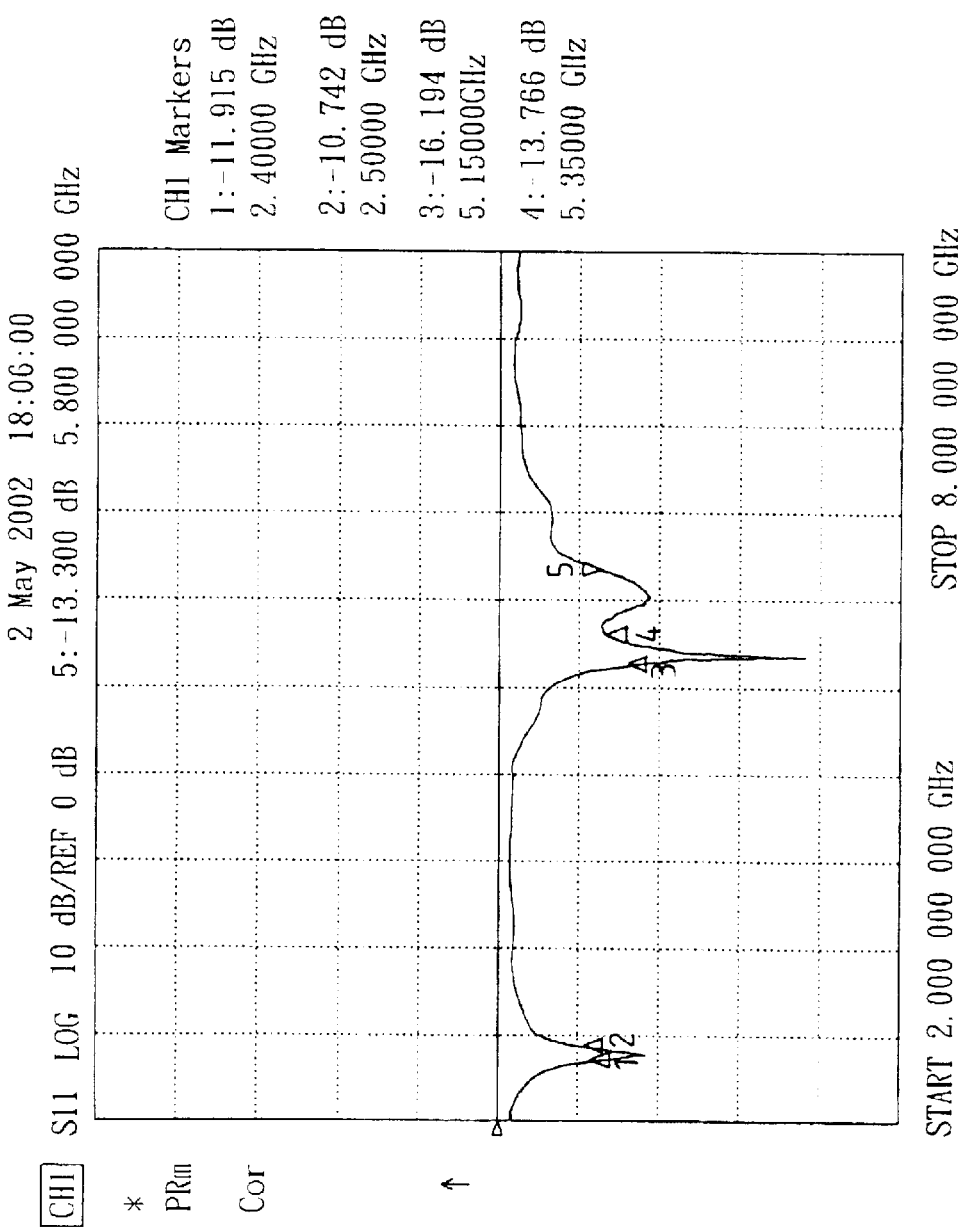
FIG. 8 shows a return loss frequency response chart that illustrates an integrated antenna of the second embodiment disposed in a main frame of a portable computer.

Referring to FIG. 8, the integrated antenna 4 of the second embodiment and the coaxial cable with the length 150 mm are mounted on the main frame of the portable computer, and a simulation for the embodiment is measured. As a result, the integrated antenna 4 is capable of multi-band operation, for example, 2.45 GHz and 5.2 GHz, and has high radiation efficiency and stable performance better than the above first embodiment.

Figure 5:
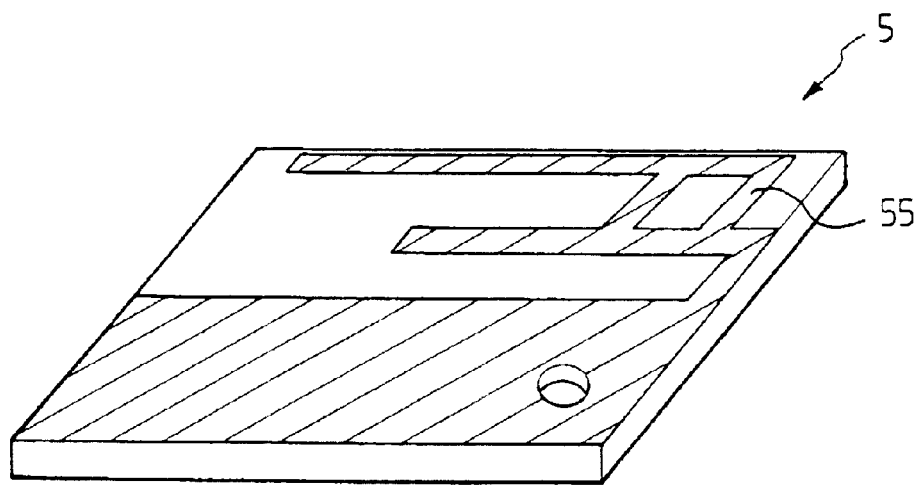
FIG. 5 shows the perspective view of an integrated antenna, according to the third embodiment of the invention.

Referring to FIG. 5, according to the integrated antenna 5 of the third embodiment of the invention, the difference between the integrated antenna 5 of the third embodiment and the integrated antenna 3 of the first embodiment is that the first connecting metal strip 55 is not on the side of the substrate 51, and is spaced at a distance away from the side of the substrate 51.

Figure 6:
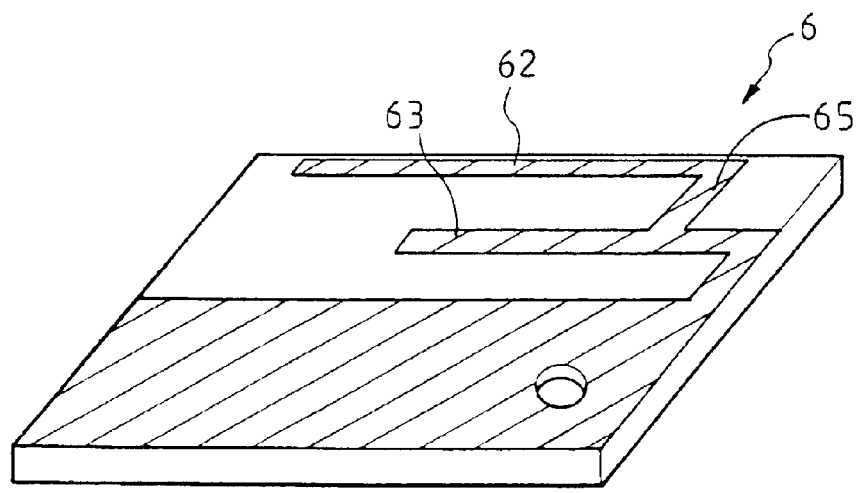
FIG. 6 shows the perspective view of an integrated antenna, according to the fourth embodiment of the invention.

Referring to FIG. 6, according to the integrated antenna 6 of the fourth embodiment of the invention, the difference between the integrated antenna 6 of the fourth embodiment and the integrated antenna 3 of the first embodiment is that the integrated antenna 6 has only a first connecting metal strip 65, and the first connecting metal strip 65 is not on the side of the substrate 61, and is spaced at a distance away from the side of the substrate 61.

While an embodiment of the present invention has been illustrated and described, various modifications and improvements can be made by those skilled in the art. The embodiment of the present invention is therefore described in an illustrative but not restrictive sense. It is intended that the present invention may not be limited to the particular forms as illustrated, and that all modifications which maintain the spirit and scope of the present invention are within the scope as defined in the appended claims.

What is claimed is:

1. An integrated antenna for a portable computer, the portable computer having a main frame, the integrated antenna comprising:

a substrate, having a first surface and a connecting portion for connecting to the main frame;

a first radiating metal strip, formed on the first surface of the substrate, used to induce a first resonance;

a second radiating metal strip, formed on the first surface of the substrate with respect to the first radiating metal strip, used to induce a second resonance;

ground plane, formed on the first surface of the substrate with respect to the second radiating metal strip;

at least one first connecting metal strip, connecting to the first radiating metal strip and the second radiating metal strip, and formed on the first surface of the substrate; and a second connecting metal strip, connecting to the second radiating metal strip and the ground plane, and formed on the first surface of the substrate; and wherein the first radiating metal strip further comprises a first extending portion extending toward the ground plane, and the second radiating metal strip further comprises a second extending portion extending toward the first radiating metal strip.

2. The integrated antenna according to claim 1, wherein the second radiating metal strip further comprises a feed portion for connecting a signal terminal of a coaxial cable, and the ground plane further comprises a ground portion for connecting a ground terminal of the coaxial cable.

3. The integrated antenna according to claim 1, wherein the second radiating metal strip is spaced at a distance from the ground plane, and is substantially parallel to the ground plane.

4. The integrated antenna according to claim 1, wherein the connecting portion is disposed on the ground plane, the connecting portion has a hole penetrating through the ground plane and the substrate, and the hole is used to receive a screw to fix the integrated antenna on the main frame of the portable computer.

5. An integrated antenna comprising:

a substrate, having a first surface;

a first radiating metal strip, formed on the first surface of the substrate, and used to induce a first resonance;

a second radiating metal strip, formed on the first surface of the substrate with respect to the first radiating metal strip, and used to induce a second resonance;

a ground plane, formed on the first surface of the substrate with respect to the second radiating metal strip;

at least one first connecting metal strip, connecting to the first radiating metal strip and the second radiating metal strip, and formed on the first surface of the substrate;

a second connecting metal strip, connecting to the second radiating metal strip and the ground plane, and formed on the first surface of the substrate; and wherein the first radiating metal strip further comprises a first extending portion extending toward the ground plane, and the second radiating metal strip further comprises a second extending portion extending toward the first radiating metal strip.

6. The integrated antenna according to claim 5, wherein the second radiating metal strip further comprises a feed portion for connecting a signal terminal of a coaxial cable, and the ground plane further comprises a ground portion for connecting a ground terminal of the coaxial cable.

7. The integrated antenna according to claim 5, wherein the second radiating metal strip is spaced at a distance from the ground plane, and is substantially parallel to the ground plane.

* * * * *